(12) United States Patent
Kimiyama et al.

(10) Patent No.: US 9,177,359 B2
(45) Date of Patent: Nov. 3, 2015

(54) INFORMATION PROCESSOR, CLOUD PLATFORM, INFORMATION PROCESSING METHOD, AND COMPUTER PROGRAM PRODUCT THEREOF

(71) Applicant: Kabushiki Kaisha Toshiba, Tokyo (JP)

(72) Inventors: Kenji Kimiyama, Kanagawa (JP); Toshio Sato, Kanagawa (JP); Yoshihiko Suzuki, Tokyo (JP); Yusuke Takahashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/161,789

(22) Filed: Jan. 23, 2014

(65) Prior Publication Data
US 2014/0254952 A1 Sep. 11, 2014

(30) Foreign Application Priority Data
Mar. 11, 2013 (JP) .................. 2013-048315

(51) Int. Cl.
*G06K 9/36* (2006.01)
*G06T 3/40* (2006.01)
(Continued)

(52) U.S. Cl.
CPC ............ *G06T 3/4053* (2013.01); *G06F 3/1454* (2013.01); *G06T 11/60* (2013.01);
(Continued)

(58) Field of Classification Search
CPC ... G06F 3/1446; G06F 3/1454; G06F 3/1438; G06F 3/14; G06F 8/44; G06F 9/3879; G09G 2340/0407; G09G 5/395; G09G 2360/18; G09G 2340/12; G06T 2200/16; G06T 3/4053; H04N 7/012; H04N 17/04; G01S 17/89; G06K 9/00288; G08G 1/0133; H04L 41/064

USPC .......... 348/433, 555, 726; 375/261, 280, 298, 375/308, 324, 332; 382/299, 284, 260, 159
See application file for complete search history.

(56) References Cited

U.S. PATENT DOCUMENTS 5,477,397 A * 12/1995 Naimpally et al. ........... 386/230
5,555,275 A * 9/1996 Oshima ........................ 375/261
(Continued)

FOREIGN PATENT DOCUMENTS

| JP | 2002199392 A | 12/2002 |
|----|--------------|---------|
| JP | 2005176069 A | 6/2005 |

(Continued)

OTHER PUBLICATIONS

Extended European Search Report issued in related European Patent Application No. 14151907.4 mailed Mar. 20, 2014; 6 pages.
(Continued)

*Primary Examiner* — Vu Le
*Assistant Examiner* — Aklilu Woldemariam
(74) *Attorney, Agent, or Firm* — Baker Botts L.L.P.

(57) ABSTRACT

According to one embodiment, an information processor divides input image data for a plurality of information processors so as to perform a super resolution process as a distributed processing. The super resolution process generates a high resolution image based on a plurality of low resolution input images. The information processor includes a division point determining unit, a division processor, and a combination processor. The division point determining unit determines a division point for an input image of a sequence of image frames. The division processor divides, for each of the information processors, the input image at the division point, and allocates each divided input image to each corresponding one of the information processors.

17 Claims, 7 Drawing Sheets

(51) Int. Cl.
    *G06T 11/60*         (2006.01)
    *G09G 5/00*          (2006.01)
    *G06F 3/14*          (2006.01)

(52) U.S. Cl.
    CPC .............. *G09G 5/001* (2013.01); *G06F 3/1446* (2013.01); *G06K 9/36* (2013.01); *G09G 2340/0407* (2013.01); *G09G 2340/10* (2013.01); *G09G 2340/12* (2013.01); *G09G 2360/06* (2013.01); *G09G 2360/08* (2013.01)

(56) References Cited

U.S. PATENT DOCUMENTS

| | | | |
|---|---|---|---|
| 5,600,672 A * | 2/1997 | Oshima et al. | 375/219 |
| 6,233,279 B1 * | 5/2001 | Boon | 375/240.08 |
| 7,158,577 B1 * | 1/2007 | Oshima | 375/261 |
| RE41,001 E * | 11/2009 | Oshima et al. | 375/219 |
| 7,894,541 B2 * | 2/2011 | Oshima | 375/261 |
| 8,261,213 B2 * | 9/2012 | Hinckley et al. | 715/863 |
| 2006/0188024 A1 * | 8/2006 | Suzuki et al. | 375/240.23 |
| 2006/0262864 A1 * | 11/2006 | Shi et al. | 375/240.27 |
| 2008/0075326 A1 * | 3/2008 | Otani et al. | 382/106 |
| 2009/0002263 A1 | 1/2009 | Pasetto | |
| 2009/0089453 A1 | 4/2009 | Bohan et al. | |
| 2009/0147130 A1 | 6/2009 | Kim | |
| 2009/0153694 A1 * | 6/2009 | Takayama | 348/222.1 |
| 2011/0026811 A1 * | 2/2011 | Kameyama | 382/159 |
| 2011/0026849 A1 * | 2/2011 | Kameyama | 382/260 |
| 2011/0037894 A1 * | 2/2011 | Sbaiz | 348/441 |
| 2011/0170784 A1 * | 7/2011 | Tanaka et al. | 382/195 |
| 2012/0195376 A1 * | 8/2012 | Wu et al. | 375/240.12 |
| 2012/0256916 A1 * | 10/2012 | Kitamura et al. | 345/419 |
| 2013/0202197 A1 * | 8/2013 | Reeler et al. | 382/154 |
| 2014/0126644 A1 * | 5/2014 | Strom et al. | 375/240.16 |

FOREIGN PATENT DOCUMENTS

| | | |
|---|---|---|
| JP | 2009171134 A | 7/2009 |
| JP | 2009-290710 A | 12/2009 |
| JP | 2012186593 A | 9/2012 |
| JP | 2012257120 A | 12/2012 |
| JP | 2013025668 A | 4/2013 |

OTHER PUBLICATIONS

Office Action issued in related Japanese Patent Application No. 2013-048315, mailed Jun. 30, 2015 (9 pages with translation).

* cited by examiner

INFORMATION PROCESSOR, CLOUD PLATFORM, INFORMATION PROCESSING METHOD, AND COMPUTER PROGRAM PRODUCT THEREOF

CROSS-REFERENCE TO RELATED APPLICATIONS

This application is based upon and claims the benefit of priority from Japanese Patent Application No. 2013-048315, filed on Mar. 11, 2013, the entire contents of which are incorporated herein by reference.

FIELD

Embodiments described herein relate generally to an information processor, a cloud platform, an information processing method, and a computer program product thereof.

BACKGROUND

In recent years, a television or a display to which a super resolution technology is applied is available in the market. The super resolution technology is a technology for reproducing a detailed portion (a component of the Nyquist frequency or higher) that disappears at the time of sampling pixels of an image (at the time of photoelectric conversion or a reduction process by an imaging element), through image processing. For example, when a video of a video camera of the NTSC system or a DVD that has low resolution is displayed on a large-screen liquid crystal TV while using the super resolution technology, a detailed portion is reproduced and a clear image having high resolution can be acquired.

While there have been proposed various systems implementing the super resolution technology, there exists an image processing technology referred to as a multiple frame super resolution that generates a high-resolution output image by matching positions of a plurality of frames of low-resolution input images. In the multiple frame super resolution, while a processing result of high image quality having high resolution can be acquired, there is a high processing load.

Meanwhile, a platform (cloud platform) of cloud computing capable of handling a large scale data by connecting a plurality of servers through a network and distributing the process has been prepared, and the super resolution process can be performed in a distributed manner on the platform. Conventionally, the super resolution process is performed at one node (information processor). However, in such a case, the processing time is too long and thereby, there has been proposed a technology for performing a distributed process at a plurality of nodes using a cloud platform.

However, conventionally, when the multiple frame super resolution process is performed as the distributed process at a plurality of nodes, compatibility with the cloud platform is not so good as well as compressed and encoded image could not efficiently handled.

DETAILED DESCRIPTION

In general, according to one embodiment, an information processor divides input image data for a plurality of information processors so as to perform a super resolution process as a distributed processing. The super resolution process generates a high resolution image based on a plurality of low resolution input images. The information processor includes a division point determining unit, a division processor, and a combination processor. The division point determining unit determines a division point for an input image at a sequence of image frames. The division processor divides, for each of the information processors, the input image at the division point, and allocates each divided input image to each corresponding one of the information processors. The combination processor combines results of the super resolution process performed by the each of the information processors, and outputs a result of the combination.

First Embodiment

Figure 1:
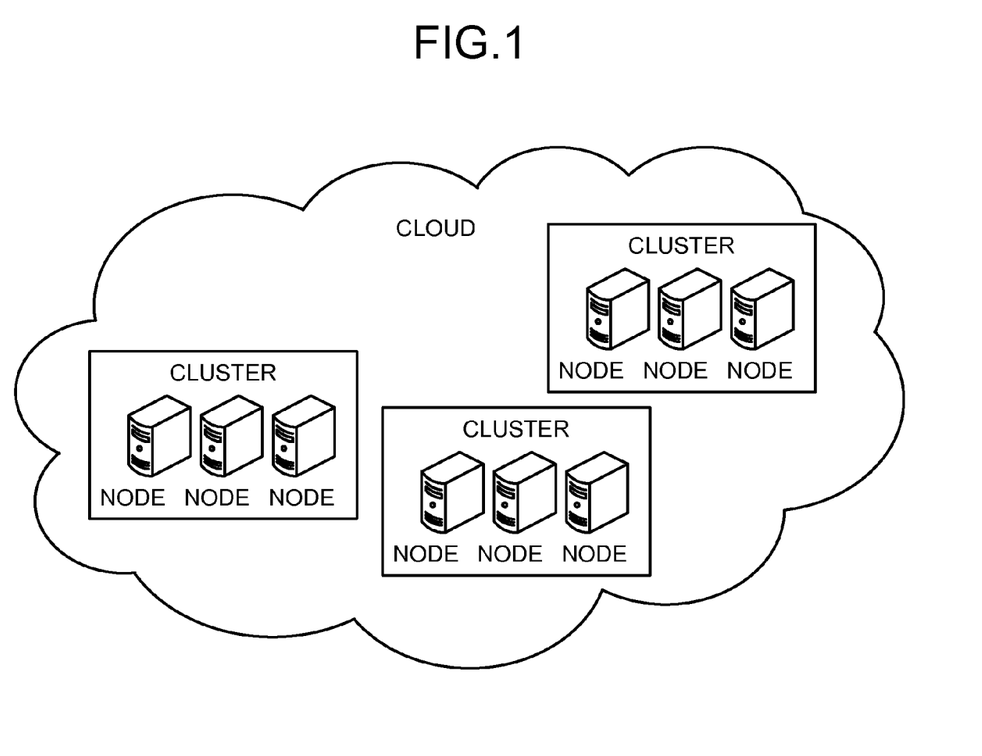
FIG. 1 is a diagram illustrating an example of a configuration of a general cloud platform according to an embodiment.

FIG. 1 is a diagram that illustrates an example of a configuration of a general cloud platform. The cloud platform is a platform in which a plurality of nodes is clustered in a local network, and the local networks are combined in a global network. A process is dynamically allocated to each node on the cloud platform as is necessary, which is different from a conventional system in which a process is fixedly allocated to each node.

The cloud platform according to the embodiment is assumed to perform a multi-frame super resolution process (hereinafter, referred to as a super resolution process) on such a cloud platform. Basic techniques described in this embodiment are not limited to this cloud platform but can be applied to a platform in which a process is fixedly allocated to each node, an embedded system, or a system LSI, and the platform and the like can be similarly operated.

Figure 2:
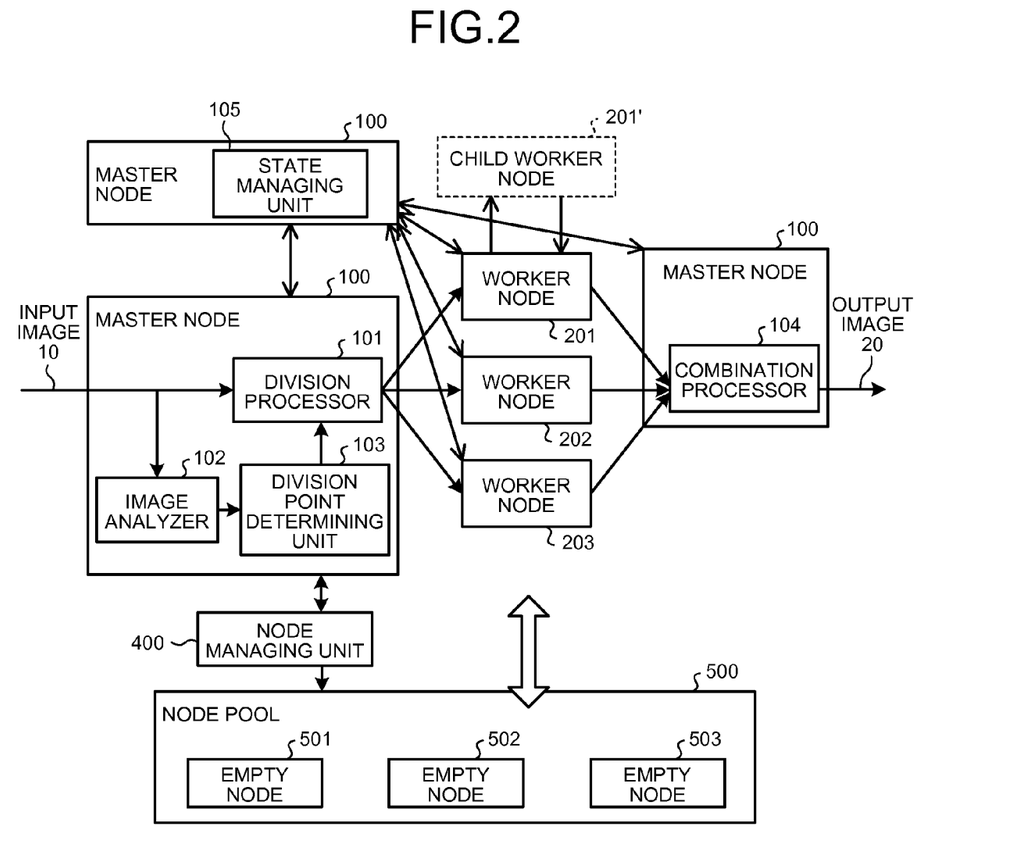
FIG. 2 is a block diagram illustrating an example of a cloud platform in embodiment.

FIG. 2 is a block diagram that illustrates an example of the cloud platform according to this embodiment.

The cloud platform illustrated in FIG. 2 is configured by one master node 100, three worker nodes 201 to 203, a node managing unit 400, and a node pool 500 in this example. Each constituent element is included in the cloud platform. In addition, as is necessary, one or more child worker nodes 201' (described later) are included as constituent elements. The node pool 500 is a supply source of the worker nodes 201 to 203 and the child worker node 201'. Nodes that are worker nodes but are not necessary are returned to the node pool as empty nodes 501 to 503.

Input image data 10 is input to the master node 100. An image analyzer 102 of this master node 100 determines characteristics (the image complexity (whether the image corresponds to a flat portion, a portion including many edges and textures, or the like), a GOP boundary, or the like of an image) of an image of the input image data 10.

A division point determining unit 103 performs a division point determination for the input image data 10 at a boundary between frames or at a boundary within the image (for example, a boundary between blocks that are units for the process performed at the time of coding the image or the like) that are appropriate to the super resolution processes performed by each of the worker nodes 201 to 203. Hereinafter, it is assumed that divisions are made in units of frames, and thus, the division point determination will be described to be performed on the boundary between frames.

Figure 3:
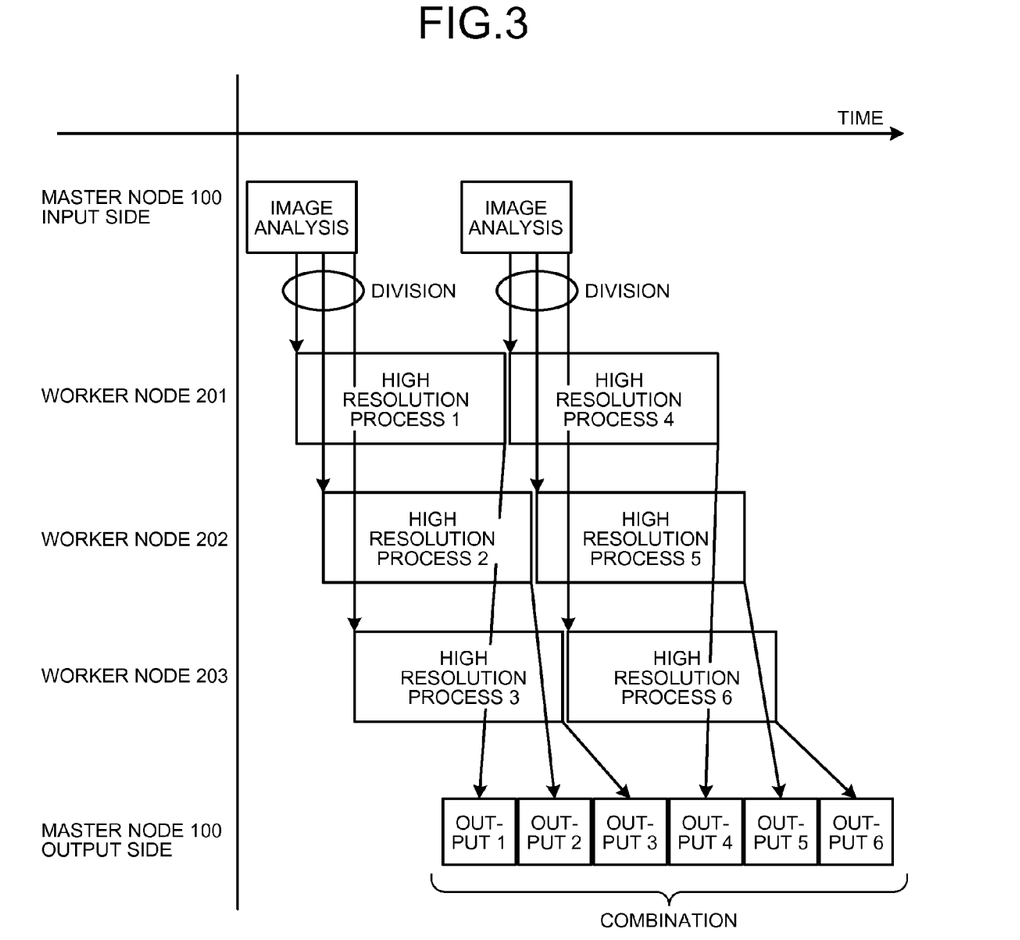
FIG. 3 is a diagram illustrating a distributed process at each node in the embodiment.

A division processor 101 divides a frame (a plurality of frames) based on the determination made by the division point determining unit 103, allocates each of divided frames to each respective one of the worker nodes 201 to 203, and requests the worker nodes to perform the process. Each of the worker nodes 201 to 203 performs a process on a group of images divided in units of frames. The processing results of the worker nodes 201 to 203 are combined in the order of the input image data 10 input to the master node 100 by a combination processor 104 and are output (see FIG. 3). Here, the number of worker nodes may be two or more and may be determined in consideration of a required processing time, node usage fees, and the like.

Here, criteria for determining a length of divided sequence of frames of an input image will be described.

The division length (the number of frames) is determined based on the usable number of worker nodes, the processing capability thereof, and the communication capability. The usable number of worker nodes is determined based on the number of all the nodes that configure the cloud, the number of nodes under contract in case the nodes are rented, and the number of nodes used by processes other than the super resolution process. The processing capability of the worker nodes are not uniform and change in accordance with the hardware configuration of a server that is used as the worker node. For example, there are differences in the clock frequency of the CPU, a memory capacity, and a storage capacity between servers. In consideration of such conditions, the processing capacities are determined such that the outputs of the plurality of worker nodes are ready in time for the timing at which the combination processor 104 generates output image data 20 (the output image data is output within a set time with respect to the timing) and idle time does not occur in each node relating to the super resolution process as possible as can.

The processing time of the super resolution process changes in accordance with the degree of complexity of an input image. That is to say, the processing time for an input image including many edges or textures is longer than the processing time for an input image including many flat portions. Thus, if the division length of the frames is determined based on the processing capabilities of the worker nodes 201 to 203, the actual processing time becomes different from the processing time assumed based on the capabilities (the processing capabilities and/or the communication capabilities) of each of the worker nodes 201 to 203. However, such difference is not preferable. Thus, in this embodiment, the image analyzer 102 analyzes the characteristics of the image, in advance. Consequently, the accuracy of the prediction of the processing times of the worker nodes 201 to 203, which are assumed when the division process is performed by the division processor 101, is improved. As for the above-described degree of complexity, for example, contour (edge) extraction is performed using a well-known Sobel operator or Prewitt operator for the input image, and the ratio of contours to the whole pixel is set as the degree of complexity of the input image. Here, upon acquiring of the degree of complexity, because the vertical or horizontal direction of the contour is not involved, the degree of complexity is calculated for all the contours. Further, the accuracy of the prediction of the processing time is improved as follows. That is, the degree of influence by the degree of complexity on the actual processing time is measured in advance. Then, the degree of the influence, for example, is represented by a coefficient, and stored (for example, for a curtain degree of complexity, when the actual processing time is 1.2 times the assumed processing time, the coefficient is set to 1.2). Then, the processing time assumed based on the capability of each one of the worker nodes 201 to 203 is multiplied by the coefficient.

In addition, according to this embodiment, if a process at a specific worker node (any one of the worker nodes 201 to 203) has been delayed during the process, the following is performed. That is, a state managing unit 105 checks the status, the division processor 101 re-divides a portion of the input image data 10 that has not been processed using the above-described technique, the state managing unit 105 sends a request to acquire a new worker node to the node managing unit 400, and the new worker node is caused to start its process. On the other hand, when there is a spare time in the processing time, the following is performed. That is, the state managing unit 105 checks the status, the division processor 101 re-divides a portion of the input image data 10 that has not been processed using the above-described technique for worker nodes (for example, reference numerals 201 and 202 represented in FIG. 2) that have not been returned to the node pool 500, and the state managing unit 105 requests the node managing unit 400 to return an unused worker node (for example, reference numeral 203 represented in FIG. 2) to the node pool 500. Here, the worker nodes 201 to 203 are configured to provide information of the process status of the apparatus for the state managing unit 105.

Figure 4:
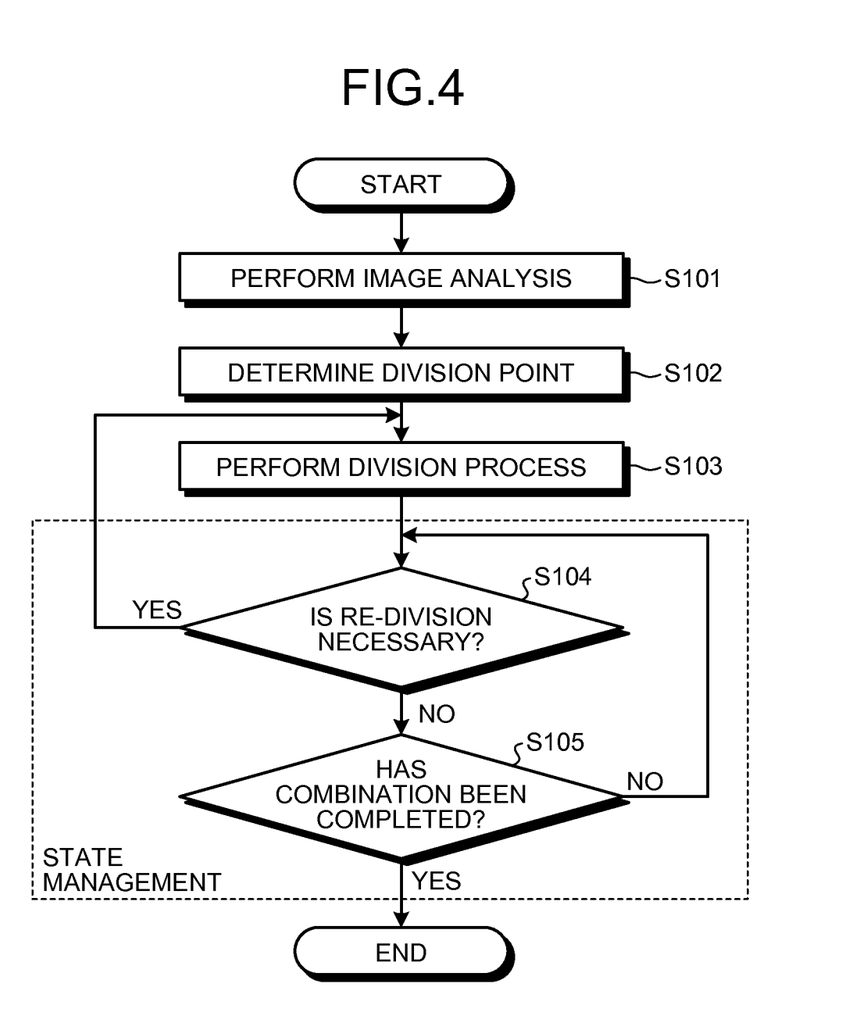
FIG. 4 is a flowchart illustrating an overview of the operation of a master node 100 in the embodiment.

Here, the operation of the master node 100 will be described with reference to FIG. 4. FIG. 4 is a flowchart that illustrates an overview of the operation of the master node 100.

In the master node 100, first, the image analyzer 102, as described above, analyzes the characteristics of an input image in S101.

Subsequently, in S102, the division point determining unit 103 determines division points based on the analysis result acquired by the image analyzer 102 and information (the process status of each worker node) supplied from the state managing unit 105.

Subsequently, in S103, the division processor 101 secures necessary worker nodes (for example, reference numerals 201 to 203 represented in FIG. 2) through the node managing unit 400 based on the determination result acquired by the division point determining unit 103, divides the input image data 10 (rows of the frame), and allocates the divided frames to each worker node.

In addition, the state managing unit 105 determines whether re-division is necessary based on the super resolution process state (process status) of each worker node. If re-division is necessary (Yes at S104), the process is returned to S103, and the above-described re-division is performed.

If re-division is not necessary at this time point (No at S104), the state managing unit 105 determines whether a combination process performed by the combination processor 104 has ended. If the combination process has not ended (No at S105), the process is returned to S104. On the other hand, if the combination process has ended (Yes at S105), the process ends.

Next, the determination criteria of division points will be described.

Division Based on Scene Change Point

If an input image is an edited content, there exists a change point of a scene (scene change point). As for the characteristics of the multiple frame super resolution, it is required to detect a corresponding point between two frames. However, a corresponding point cannot be detected between the frames before and after the scene change. Accordingly, this scene change point is set as a division point. The detection of a scene change can be performed using a known technique disclosed in Japanese Patent Application Laid-open No. 2006-121274 or Japanese Patent Application Laid-open No. 2006-270301.

Here, if an image is divided into a cut (a group of frames) in accordance with the scene change, there exists no previous position matching frame in the first frame of the cut and there exists no next position matching frame in the final frame of the cut. Thus, in order to prevent decrease in a number of corresponding points, a next position matching frame is added to the first frame of the cut. Similarly, a previous position matching frame is added to the final frame of the cut. More specifically, for example, if a setting in which previous two frames and next two frames are used, next four frames are used in the first frame of a cut and a previous one frame and next three frames are used in the second frame of the cut. Consequently, the number of corresponding points is prevented from being decreased.

Division Based on Group of Pictures (GOP)

There are many cases in which the input image data 10 is encoded so as to reduce the amount of transmission via a network or to reduce the amount of storage. If the encoding algorithm is based on a difference between frames, the division cannot be made on an arbitrary frame boundary. For example, according to Moving Picture Experts Group (MPEG) 2 or the like, I frame, P frame, and B frame are provided. The I frame does not use a difference between frames, and is inserted into a sequence of frames at a constant interval. The P frame is acquired by encoding a difference between the frame itself and a prior screen (frame) or a subsequent screen (frame). The B frame is acquired by encoding a difference between a prior screen and a subsequent screen. Thus, while the I frame can be decoded independently, the P frame and the B frame cannot be decoded without at least one of the prior image and the subsequent image from which the difference is acquired. Accordingly, if such encoded image is divided, it is necessary to make division in units of GOP that is a group of frames formed to have the I frame at the beginning of the GOP. Accordingly, the image analyzer 102 determines a GOP boundary based on a sequence header (a starting point of the GOP) of the input image data 10, and the division processor 101 makes division on the GOP boundary.

Division Based on Corresponding Points

The length of the frames divided based on the determination criteria of the above-mentioned division point might not be optimal. Thus, a distributed process is performed by determining, during the position matching of a worker node 20x (any one of the worker nodes 201 to 203), a boundary at which the number of corresponding points is less than a set value, and by performing the re-division at the determined boundary. Accordingly, in this example, the worker node 20x (201 to 203) is configured to have the same function (constituent elements) as that of the master node 100. A division point determining unit of the worker node 20x makes the above-described determination, and a state managing unit of the worker node 20x sends a request to a node managing unit 400 to newly generate a child worker node 201', and the node managing unit 400 starts at least one unused empty nodes from the node pool 500 as the child worker node 201'. The worker node 20x stops a subsequent position matching process and proceeds to a reconfiguration process. The child worker node 201' starts a subsequent process after the position matching process for the stopped frame and subsequent frames and delivers the processing result to a parent worker node 20x.

Division Based on Global Motion Vector

A global motion vector is a vector that represents the motion of the whole screen. The global motion vector is mainly generated in accordance with a motion of a camera such as pan or tilt. In the middle of position matching, when the motion of the whole screen is abrupt, the position matching process in the super resolution process cannot be followed, and corresponding points cannot be acquired. Accordingly, the worker node 20x (201 to 203) is configured to have the same function (constituent element) as that of the master node 100, the division point determining unit of the worker node 20x detects a change point (a frame boundary on which the magnitude of the global motion vector is larger than a set value) between such frames, and the position is set as the division point. Then, the division processor of the worker node 20x makes re-division, and, similar to the example of the division based on the corresponding points, the state managing unit of the worker node 20x sends a request to the node managing unit 400 to newly generate a child worker node 201', and the node managing unit 400 starts at least one unused empty nodes from the node pool 500 as a child worker node 201', whereby the distributed process is performed. On the other hand, if there is no motion at all in the image, even when corresponding points are requested, there is no effect on the implementation of high resolution. Such a non-change point is detected and is set as a division point. In addition, the global motion vector can be acquired by using a known technique, for example, disclosed in Japanese Patent Application Laid-open No. 2008-502196 or the like in a motion vector calculating unit 23.

If the length after the division is still long even when (a plurality of) frames are divided as described above, the child worker node further makes division of (a plurality of) the frames and sends a request to the node managing unit 400 to start the operation of an additional child worker node from the worker node. The additional child worker node (son) for the child worker node (parent) serves the same as the above-described child worker node (parent).

Figure 5:
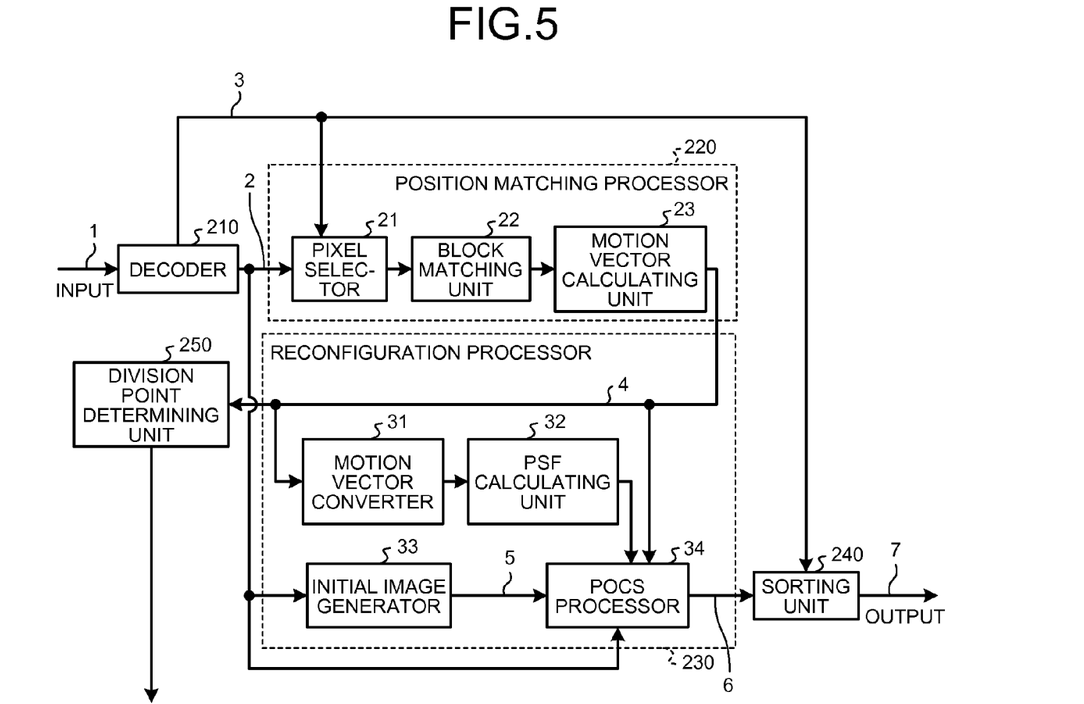
FIG. 5 is a block diagram illustrating an example of a configuration of a worker node of when an encoded image, which is encoded using MPEG2 or the like, is input, in the embodiment.

FIG. 5 is a block diagram that illustrates an example of the configuration of the worker node in a case where an encoded image that is encoded using MPEG2 or the like is input. After an encoded image of input 1 is converted into non-compressed image data 2 by a decoder 210, a super resolution process is performed for the converted image data. In the input encoded image, frames are rearranged, and accordingly, it is necessary to return the frames in a correct frame sequence. Thus, after the frames are rearranged by a sorting unit 240, image data after the rearrangement is output as an output 7. This configuration of the worker node is different from that of the worker node not handling an encoded image is the addition of the decoder 210 and the sorting unit 240.

Here, parts (parts except for the decoder 210 and the sorting unit 240) that are common to an ordinary worker node performing the super resolution process will be described with reference to FIG. 5. The following example of the configuration is the same as the functional configuration of an image processor that performs a multiple frame super resolution process using a known projection onto convex sets (POCS) method, and, hereinafter, an overview thereof will be described. As illustrated in FIG. 5, a position matching processor 220 includes a pixel selector 21, a block matching unit 22, and the motion vector calculating unit 23. Further, a reconfiguration processor includes a motion vector converter 31, a point spread function (PSF) calculating unit 32, an initial image generator 33, and a POCS processor 34.

The pixel selector 21 selects candidates for corresponding points (points representing the same position in different frames) from the input image data 2. The block matching unit 22 acquires a corresponding point to be used from among the candidates for the corresponding points acquired by the pixel selector 21 by using a so-called block matching technique. The motion vector calculating unit 23 acquires displacements of the corresponding points, which have been acquired by the block matching unit 22, between frames, and the motion vector converter 31 acquires the positions of the corresponding points in a coordinate system after enlargement. The PSF calculating unit 32 acquires known simultaneous equations (PSF) used for the correction for the implementation of high resolution. The initial image generator 33 generates a provisional high resolution image 5 (here, an enlarged image that is enlarged through linear interpolation). The POCS processor 34, as is well known, corrects the provisional high resolution image 5 generated by the initial image generator 33 by using the PSF acquired by the PSF calculating unit 32. Therefore, a high resolution image 6 is generated.

Figure 7:
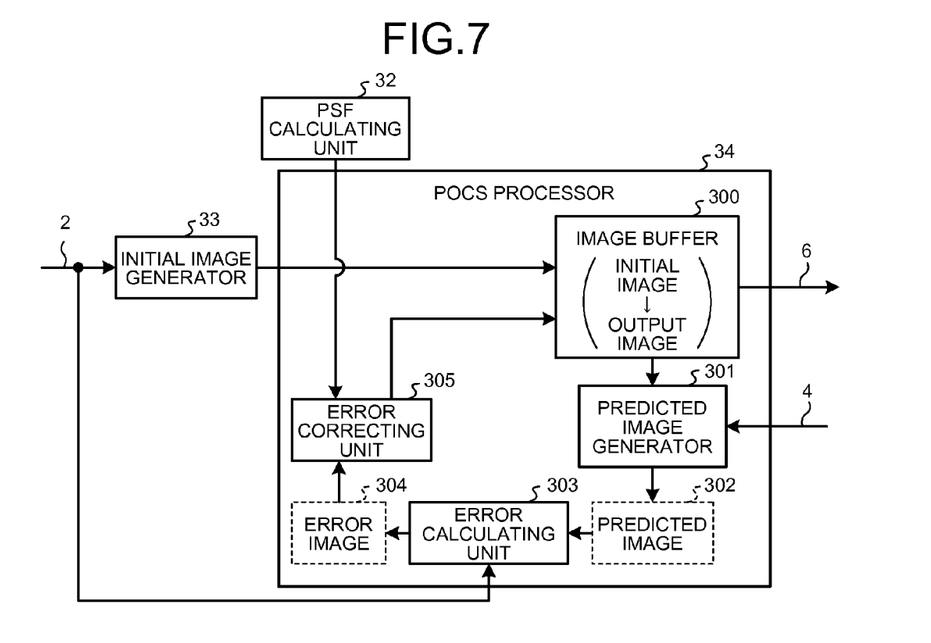
FIG. 7 is a diagram illustrating an example of a configuration of a POCS processor in the embodiment.

Here, an example of the configuration of the POCS processor 34 will be described with reference to FIG. 7.

Figure 6:
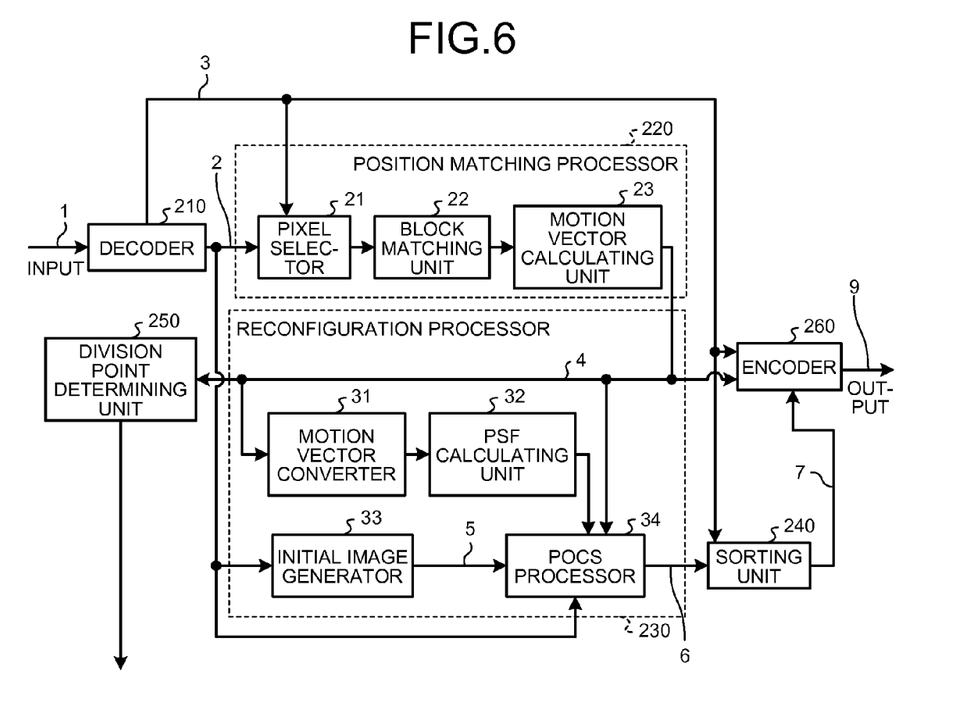
FIG. 6 is a diagram illustrating an example of a configuration acquired by adding an encoder to the configuration illustrated in FIG. 5, in the embodiment.

An initial image that is interpolated and enlarged by the initial image generator 33 is input to an image buffer 300. A predicted image generator 301 generates a predicted image 302 based on a motion vector 4. The generated predicted image 302 is compared by an error calculating unit 303 with a source video having first resolution as image data 2 (in a case where image data of the input 1 is not coded, the image data) after decoding performed by the decoder 210, and an error image 304 is generated. An error correcting unit 305 generates an output image acquired by correcting the initial image by using the error image 304 and the PSF acquired by the PSF calculating unit 32 and stores the output image in the image buffer 300. The above-described process performed by the predicted image generator 301 to the error correcting unit 305 is performed several times until the error becomes a predetermined amount, and a final output image 6 is output. The decoder 210 illustrated in FIG. 5 is a processor that performs decoding corresponding to the coding system of the input coded data (input 1), and the sorting unit 240 is a processor that performs sorting corresponding to the coding system. The configuration illustrated in FIG. 6 is acquired by adding an encoder 260 to the configuration illustrated in FIG. 5.

However, there are cases where the number of frames configuring the GOP does not correspond to an expected division length. Thus, in a worker node having the same function as that of the master node 100, a division point determining unit 250 (FIGS. 5 and 6) monitors the number of outputs (corresponding to the number of corresponding points) of the motion vectors 4 according to the motion vector calculating unit 23 and detects a new division point at which the number of outputs is equal to or less than a set value. Then, as described above, the distribution process is performed by starting the operation of the child worker node.

In addition, when the image is encoded, although the quality of the image formed by the I frame, the P frame, and the B frame is controlled so as not to have a difference thereof, the image quality is not completely uniform. Generally, since the I frame serves as the reference for the other P and B frames, the I frame has high image quality. By using encoding frame type information 3 that represents the frame type illustrated in FIG. 5, the priority levels between frames in the pixel selector 21 at the time of narrowing down the candidates for the corresponding points are controlled. Here, a control process is performed in which the frames are used with a high priority level as corresponding points in the order of the I frame as a main frame disposed at the lead of the GOP, the P frame, and the B frame (the B frame is used when the number of corresponding points is small) in the super resolution process. In this example, by using the pixel of the I frame as the corresponding point with a high priority level, high resolution is implemented.

In addition, in an encoded image that is encoded using the MPEG2 or the like, frames are rearranged like I0-P3-B1-B2-P6-B4-B5. Here, each alphabet denotes a frame type, and each number represents a frame number. The original frame sequence before the rearrangement is I0-B1-B2-P3-B4-B5-P6. The reason for performing such rearrangement is that, for example, frames B1 and B2 cannot be decoded unless frames I0 and P3 have not been decoded, and accordingly, it is necessary to arrange the frame P3 first. In this embodiment, the rearrangement of the frames is not performed immediately after the decoding process, and the sequence is directly used in the super resolution process. Accordingly, the super resolution process can be performed in a speedy manner.

First Modification

If the output image after the super resolution process is not compressed and encoded, the data size of the output image is several tens to several hundreds of times of the data size of the input image. Accordingly, in the first modification, the process result is compressed and encoded before the combination of data. In addition, if a motion vector is used at the time of performing the compression and the encoding, a motion vector acquired as a result of the position matching of the super resolution process is employed. The technique to apply a sequence (GOP configuration) of the frame type or an encoding motion vector (not a motion vector of the position matching of super resolution) acquired at the time of performing decoding to encoding is well known, and, if there is no change in the image size, while the motion vector can be applied, the image size for the super resolution process increases. Thus, for example, when the size becomes twice in the vertical and horizontal directions, a motion vector acquired in units of blocks of 8×8 pixels of an input image becomes a motion vector having a low spatial density in units of 16×16 pixel blocks in an output image. On the other hand, a motion vector acquired as a result of the position matching in the super resolution process is acquired for each pixel of the input image, even in the size of an output image after the super resolution process, the motion vector has a sufficient spatial density in units of 2×2 pixel blocks. Thus, when encoding is performed, for example, using H.264/AVC, if a motion vector is to be acquired in units of 8×8 pixel blocks, 16 motion vectors in units of 16 2×2 pixel blocks are averaged to be used in the super resolution process.

In addition, there are cases in which a motion vector having higher accuracy is necessary when encoding system conversion is performed. For example, there is a case in which input image data (coding data) is in compliance with the MPEG2 and the output is in the format of the H.264/AVC. In such a case, while a motion vector of the MPEG2 has the integer pixel accuracy, a motion vector of the H.264/AVC can be used up to ¼ pixel accuracy, and accordingly, the motion vector of the encoding system before conversion cannot be applied to the motion vector of the encoding system after conversion. The motion vector acquired as a result of the position matching process in the super resolution process has fractional accuracy, and accordingly, all the encoding systems that are commonly considered can be responded. Therefore, if encoding is performed after the super resolution process, by using the motion vector acquired as a result of the position matching process in the super resolution process, encoding can be performed in an arbitrary encoding system using the motion vector.

Figure 8:
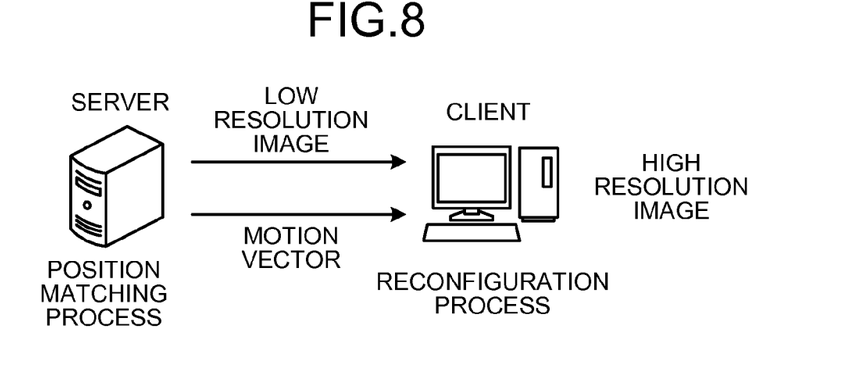
FIG. 8 is a diagram illustrating a first conventional configuration example of when a super resolution process is performed as the distributed process.
Figure 9:
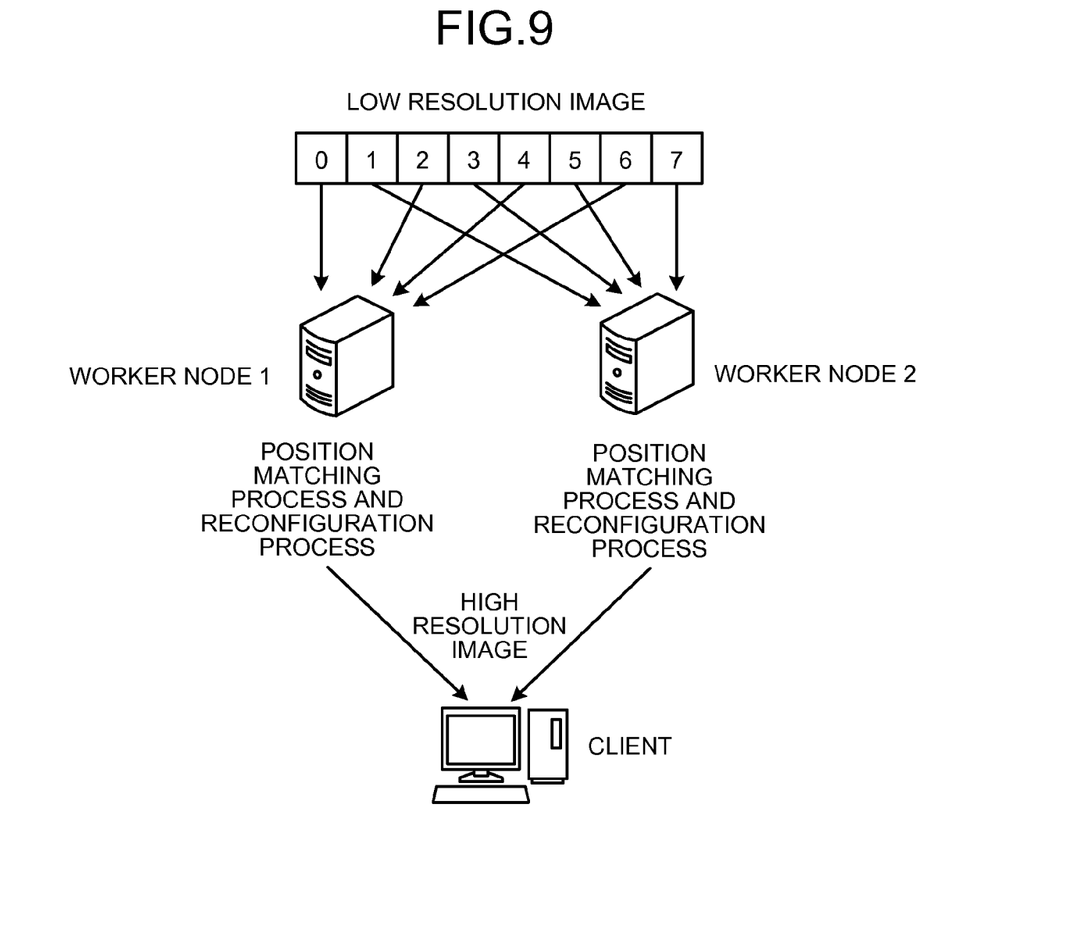
FIG. 9 is a diagram illustrating a second conventional configuration example of when a super resolution process is performed as the distributed process.

As described above, according to the first embodiment and the first modification described above, compared to a distributed process according to a conventional configuration example in which the position matching process illustrated in FIG. 8 is performed on the server side, and the reconfiguration process is performed on the client side, a conventional configuration example in which the super resolution process illustrated in FIG. 9 is performed at worker nodes, and the results thereof are combined on the client side, or the like, by dividing an input image on the above-described various frame boundaries not degrading the image quality of the result of the super resolution process and performing super resolution processes in a plurality of nodes in a parallel manner, the super resolution process capable of acquiring a high-quality and high-resolution image can be performed at a high speed. In addition, a system having excellent compatibility with the cloud platform and high efficiency can be realized.

In addition, the information processor configuring the cloud platform according to this embodiment is equipped at least with a control device such as a CPU, a storage device such as a read only memory (ROM) or a RAM, a secondary storage device such as an HDD or a CD drive device, and an external storage device and has a hardware configuration using a general computer. Various set values and the like are stored in the storage device or the secondary storage device. In addition, the information processor, as is necessary, is equipped also with a displaying device such as a display device and an input device such as a keyboard or a mouse.

Furthermore, a control or image processing program that is executed by the information processor configuring the cloud platform according to this embodiment is provided as a computer program product with being recorded in a computer-readable recording medium such as a CD-ROM, a flexible disk (FD), a CD-R, or a digital versatile disk (DVD) as a file in an installable form or an executable form. Alternatively, the program may be configured to be stored on a computer connected to a network such as the Internet and to be provided or delivered by being downloaded through the network as a computer program product. Alternatively, the program may be configured to be provided with being built in the ROM or the like in advance as a computer program product.

In addition, as the program executed by the information processor is read out and loaded on a main storage device from the storage device or the secondary storage device by the CPU (processor) equipped in the information processor, the division processor 101, the image analyzer 102, the division point determining unit 103, the combination processor 104, the state managing unit 105, and the like are generated on the main storage device.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processor that divides input image data for a plurality of other information processors, the other information processors performing a super resolution process on the divided input image creating results, the super resolution process generating a high resolution image based on a plurality of low resolution input images, the information processor comprising:
   an image analyzer that analyzes a characteristic of input image data of a sequence of image frames;
   a division point determining unit that determines, based on a result of analysis by the image analyzer, a criterion to determine a division point for the input image data among a plurality of criteria, including a scene change point, a group of pictures boundary, corresponding points, or a global motion vector, corresponding to a plurality of characteristics of the input image data, and that determines the division point based on the determined criterion;
   a division processor that divides, for each of the other information processors, the input image data at the division point, and allocates each divided input image to each corresponding one of the other information processors; and
   a combination processor that combines the results of the super resolution process performed by the each of the other information processors, and outputs a result of the combination.

2. The information processor according to claim 1, wherein the division processor determines a number of frames of each of divided sequences of image frames of the input image data in accordance with a number and a capability of the other information processors that can be used.

3. The information processor according to claim 2, wherein the capability is at least one of processing capability and communication capability.

4. The information processor according to claim 1, wherein the division processor determines the number of frames of the each of divided sequences of image frames based on the characteristic of the input image data analyzed by the image analyzer.

5. The information processor according to claim 1, wherein the division is performed so as to output the results of the super resolution process performed by the each of the other information processors within a predetermined time with respect to timing of the combining performed by the combination processor.

6. The information processor according to claim 1, wherein, when the input image data comprises a frame boundary corresponding to a scene change, the division point determining unit sets the frame boundary as the division point.

7. The information processor according to claim 1, wherein, when the input image data is configured by a sequence of Group Of Pictures, the division point determining unit sets a boundary of the GOP as the division point.

8. A cloud platform comprising a plurality of first information processors and a second information processor, wherein the second information processor is configured to divide input image data for the first information processors so as to perform a super resolution process as a distributed processing, the super resolution process generating a high resolution image based on a plurality of low resolution input images, and the second information processor comprises:

an image analyzer that analyzes a characteristic of input image data of a sequence of image frames;

a division point determining unit that determines, based on a result of analysis by the image analyzer, a criterion to determine a division point for the input image data among a plurality of criteria, including a scene change point, a group of pictures boundary, corresponding points, or a global motion vector, corresponding to a plurality of characteristics of the input image data, and that determines the division point based on the determined criterion;

a division processor that divides, for each of the first information processors, the input image data at the division point, and allocates each divided input image to each corresponding one of the first information processors; and a combination processor that combines results of the super resolution process performed by the each of the first information processors, and outputs a result of the combination.

9. The cloud platform according to claim 8, wherein the second information processor further includes a state managing unit that manages each status of the super resolution process performed by each of the first information processors, the cloud platform includes an apparatus managing unit that adds an empty apparatus that is a new first information processor to the first information processors or that returns one of the existing first information processors, when the super resolution process by one of the first information processors has been delayed, the state managing unit requests the apparatus managing unit to add an empty apparatus to the first information processors, and the division processor re-divides a sequence of unprocessed image frames for the first information processors including the added empty apparatus and allocates each of re-divided sequences of image frames to each corresponding one of the first information processors including the empty apparatus, when there is a spare time in performing the super resolution process by each of the first information processors, the division processor re-divides a sequence of unprocessed image frames for the first information processors from which one of the first information processors that is to be returned is excluded and allocates each of re-divided sequences of image frames to each corresponding one of the first information processors from which the one of the first information processors that is to be returned is excluded, and the state managing unit requests to the apparatus managing unit to set the one of the first information processors that is to be returned as the empty apparatus.

10. The cloud platform according to claim 9, wherein, when the input image data is encoded data that complies with a moving picture experts group standard, the first information processors preferentially use corresponding points for a position matching process in an order of an I frame that is placed at the beginning of a GOP, a P frame, and a B frame.

11. The cloud platform according to claim 10, wherein the first information processors perform the position matching process while maintaining an order of the I frame, the P frame, and the B frame in the encoded data.

12. The cloud platform according to claim 9, wherein each of the first information processors includes the division point determining unit, the division processor, and the combination processor of the second information processor, wherein, when the super resolution process of one of the first information processors has been delayed, a state managing unit of the one of the first information processors sends a request for acquiring at least one empty apparatus which cooperates with the one of the first information processors to the apparatus managing unit, the division processor of the one of the first information processors re-divides image data on which a position matching process has not been performed for the at least one empty apparatus and allocates the re-divided image data on which the position matching process has not been performed, and the one of the first information processors performs a reconfiguration process on the image data for which the position matching process has been completed.

13. The cloud platform according to claim 12, wherein the division point determining unit of each of the first information processors sets, as the division point, a frame boundary corresponding to a global motion vector with a magnitude larger than a set value, the global motion vector being acquired during the position matching process in the super resolution process.

14. The cloud platform according to claim 12, wherein the division point determining unit of each of the first information processors sets, as the division point, a frame boundary corresponding to a number of corresponding points or an output number of motion vectors less than a set value, the number of corresponding points and the output number of motion vectors being acquired during the position matching process in the super resolution process.

15. The cloud platform according to claim 9, wherein each of the first information processors includes an encoder that performs predetermined encoding on the image data on which the super resolution process has been performed, and the encoder uses a motion vector acquired during the super resolution process as a motion vector of the encoding performed by the encoder.

16. An information processing method performed by an information processor that divides input image data for a plurality of other information processors so as to perform a super resolution process as a distributed processing, the super resolution process generating a high resolution image based on a plurality of low resolution input images, the information processing method comprising:

analyzing, by an image analyzer, that analyzes a characteristic of input image data of a sequence of image frames;

first determining, by a division point determining unit and based on a result of the analyzing, a criterion to determine a division point for the input image data among a plurality of criteria, including a scene change point, a group of pictures boundary, corresponding points, or a global motion vector, corresponding to a plurality of characteristics of the input image data;

second determining, by the division point determining unit, the division point based on the criterion determined at the first determining;

dividing, by a division processor and for each of the other information processors, the input image data at the division point, and allocating each divided input image to each corresponding one of the other information processors; and combining, by a combination processor, results of the super resolution process performed by the each of the other information processors, and outputting a result of the combination.

17. A computer program product having a non-transitory computer readable medium including programmed instructions used in an information processor that divides input image data for a plurality of other information processors, the other processors performing a super resolution process on the divided input image creating results, the super resolution process generating a high resolution image based on a plurality of low resolution input images, wherein the instructions, when executed by a computer, cause the computer to perform:

analyzing, by an image analyzer, that analyzes a characteristic of input image data of a sequence of image frames;

first determining, by a division point determining unit and based on a result of the analyzing, a criterion to determine a division point for the input image data among a plurality of criteria, including a scene change point, a group of pictures boundary, corresponding points, or a global motion vector, corresponding to a plurality of characteristics of the input image data;

second determining, by the division point determining unit, the division point based on the criterion determined at the first determining;

dividing, by a division processor and for each of the other information processors, the input image data at the division point, and allocating each divided input image to each corresponding one of the other information processors; and combining, by a combination processor, results of the super resolution process performed by the each of the other information processors, and outputting a result of the combination.

* * * * *